Nov. 15, 1955  K. PRZYBYLSKI ET AL  2,723,845
PHOTO-ELECTRIC APPARATUS
Filed Aug. 28, 1951  5 Sheets-Sheet 4

INVENTORS
KURT PRZYBYLSKI,
GEBHARD SCHNEIDER &
HERMANN NOE
By Young, Emery & Thompson
ATTYS.

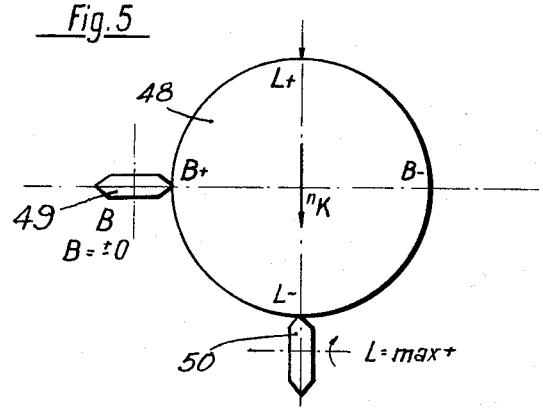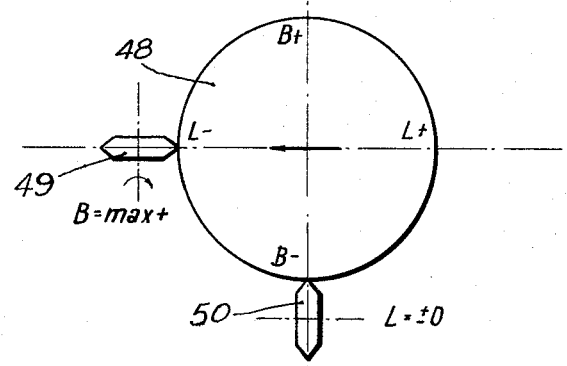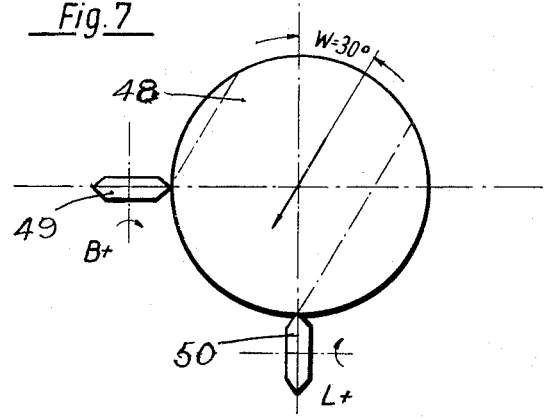

United States Patent Office 2,723,845
Patented Nov. 15, 1955

2,723,845

PHOTO-ELECTRIC APPARATUS

Kurt Przybylski, Gebhard Schneider, and Hermann Noé, Bremerhaven, Germany, assignors to Firma F. Schichau A. G., Bremerhaven, Germany, a German company Application August 28, 1951, Serial No. 244,012

Claims priority, application Germany August 28, 1950

3 Claims. (Cl. 266—23)

The invention relates to a photoelectric curve-exploring arrangement for the control of machining or like operating devices for workpieces or for other transmission of curves or contours. As a machining device, there are to be considered mainly tools which automatically separate or in some way prepare parts from an initial material (which may be made of various substances and has relatively large dimensions) in accordance with a dia-negative which is explored photoelectrically, without necessitating any operation on the part itself. According to requirements, the machining or like device may be of any desired nature, for example, a cutting burner, a centering device or a milling machine for steel plates or any other suitable working device for other materials.

The invention further relates to a photoelectric curve-exploring arrangement for the control of machining or like devices for workpieces or for the transfer from drawings, templates or other curves in a transmission ratio which is different from 1:1. The invention is particularly suitable for an exploring and controlling arrangement for machining or like devices for workpieces or for the transfer of curves in which photoelectric exploring of curves is employed, in that a photoelectric exploring device is arranged eccentrically on a rotatable explorer or feeler head and controls the rotation of the feeler head, for instance, by means of a motor or the like, and the forward movement of the feeler head is effected according to the momentary position of the latter in the direction of the eccentricity. In known photoelectric curve-exploring arrangements of the aforementioned type, the optical transmission ratio is equal to the mechanical transmission ratio, which leads to inconvenient dimensions of the exploring optical system and thus of the entire exploring arrangement, particularly when the mechanical transmission ratio between the curve to be produced and the original curve effecting the control is very large, for example 50:1 or more.

According to the invention, a photoelectric curve-exploring arrangement of the aforementioned type is provided wherein a very high operational accuracy and a great number of possible uses are obtained with a simple construction, in which a control movement corresponding to the speed of the machining or like device is split up into two component movements supplied to the machining or like device through a component-analysing means controlled by the photoelectric exploring device, the machining device effecting the machining movement in the machining plane or surface by means of said component movements.

In a further development of the invention, the control movement corresponding to the machining speed of the machining device is transmitted to a ball or sphere, the regulatable speed of rotation of which is taken off as component rotational speeds by means of friction wheels arranged in different planes of rotation and imparted to the machining device, so that an adjustment control movement corresponding to the adjustment of the ball drive relatively to the friction wheels is imparted to the machining device directly or through a multiplication or reduction gearing as a third adjustment movement. As also proposed in accordance with the invention, a further structural simplification is obtained by the fact that the machining device is secured to a boom arm which, corresponding to one of the two component movements which are derived from the component analysis device, is moved out to a different extent from a supporting carriage carrying the boom arm, the supporting carriage being given a driving movement corresponding to the other component movement. In this arrangement, the boom can project from the supporting carriage at both sides of the latter and carry at each end one or more machining devices, so that two or more workpieces can be simultaneously machined.

It is further proposed in accordance with the invention, that the supporting carriage carrying the boom arm be carried by a stationary guide bed, the side walls of which are each constituted of a U-section member and which is formed in the centre with a longitudinal recess for the feed arrangement of the supporting carriage. It is possible in this way to obtain a reliable foundation for the supporting carriage with which the high machining accuracy necessary for the control of the machining device is ensured.

In accordance with the invention, the dimensions of the exploring optical system may be reduced in such manner that the optical transmission ratio is different from the mechanical transmission ratio. With a very large mechanical transmission ratio, that is to say, from a small original control curve up to a greatly magnified operating curve, the optical transmission ratio is preferably smaller. On the contrary, it is made larger when it is a question of a reproductory transmission conversion of a large original curve into a greatly reduced operating curve (such as is frequently the case in the production of tools).

It is further proposed in accordance with the invention to arrange that the optical exploration diaphragm (effective diameter of the exploratory light beam) corresponds in size to the optical transmission ratio. When the exploring operation is carried out eccentrically, the eccentricity must according to the invention correspond to the transmission ratio.

The invention is explained by way of example with reference to the accompanying drawings, wherein:

Figure 5 is a view showing the ball-type component analyser in one limiting position;

Figure 6 is a view similar to that of Figure 5, but with the ball-type component analyser in another limiting position;

Figure 7 is an intermediate position with respect to the views given in Figures 5 and 6.

Figure 1:
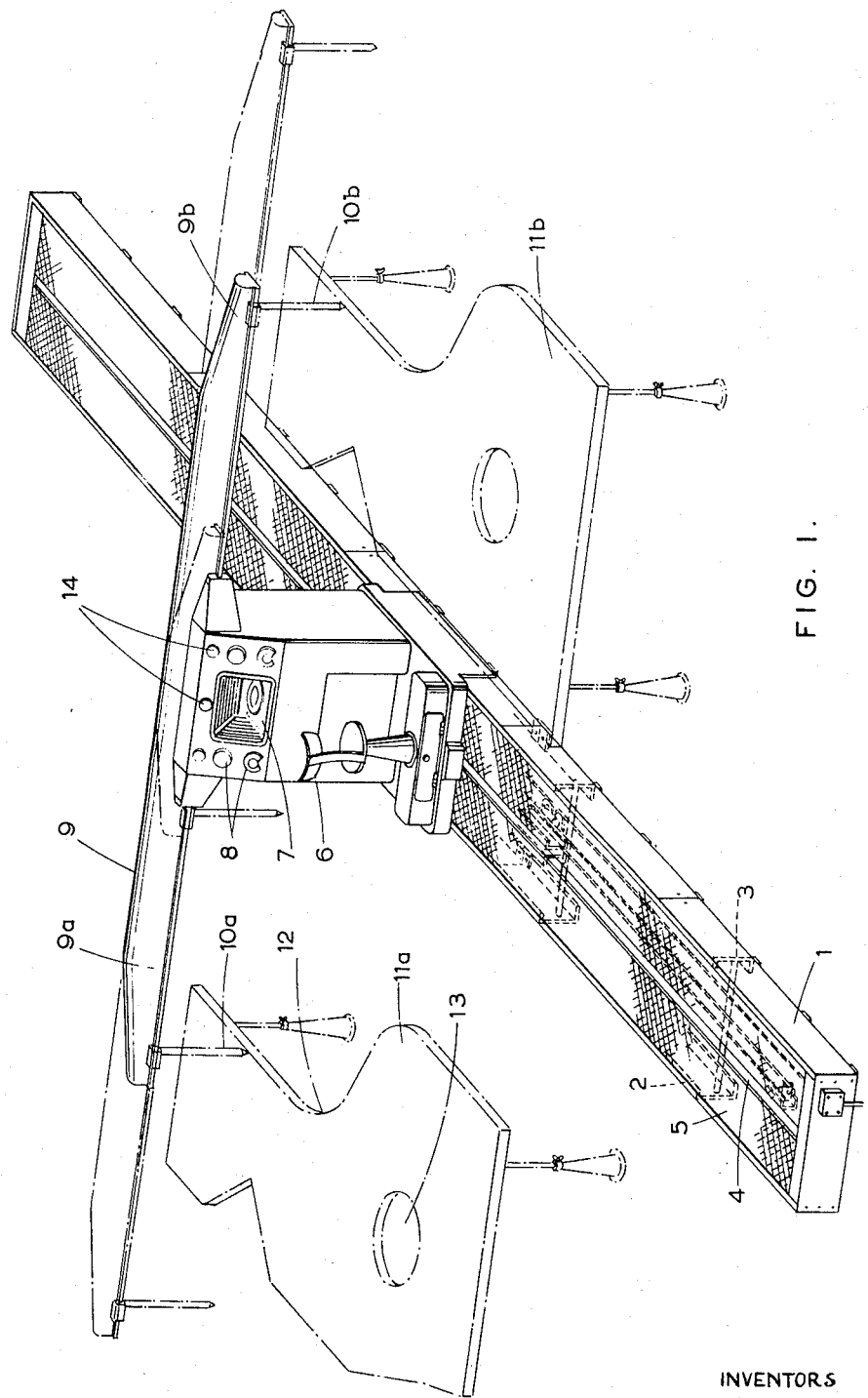
Figure 1 is a perspective view of the complete installation of a photoelectric curve-exploring arrangement made in accordance with the invention.

In the control device according to Figure 1, 1 is a rectangular guide sub-structure, the side walls of which are constituted of two U-section members 2, 3 and which is formed with a longitudinal slot 4 in the top cover plate 5. Moving in the direction of this slot (X in Figure 3) on this rectangular guide member is a supporting carriage 6 which includes the control device hereinafter described and which is constructed as an operating table, having a recess 7 in which is placed the dia-negative to be explored, the controlling and operating devices 8 being provided at a convenient position. The dia-negative is a plate which is opaque except for a transparent curve thereon.

The supporting carriage carries a boom arm 9 which extends in the transverse direction and which is able to move automatically in a direction transverse to the direction of motion of carriage 6 (Y in Figure 3), said boom carrying a curve producing work shaping device, for example a cutting burner 10a, 10b at each end 9a, 9b. By means of this machining arrangement, it is possible to machine two workpieces 11a, 11b at the same time: for example sheet metal plates can be cut out according to the external curve 12 or recesses or openings 13 may be formed therein, such operations being carried out by hand or in a fully automatic manner. The cutting length can be read off on the indicators 14 on the supporting carriage 6, both as regards their total length and the component lengths. The control curve according to which the workpiece 11a or 11b is to be automatically machined is indicated at 15 in Figure 2 and is positioned on a dia-negative 16 which is placed in the image holder 17 located in the recess 7 (Fig. 1) of the supporting carriage 6. The adjustment or setting of the negative can be carried out by means of aligning elements.

The image holder 17 and thus the negative plate 16 and the curve 15 are likewise moved in the component directions at right-angles to one another according to the arrows $x$ and $y$, so that there is a definite regulatable transmission ratio between X and $x$ and between Y and $y$. This transmission ratio can be 1 to 100 or any desired ratio and it is still possible to maintain the machining accuracy prescribed for the machining of the workpieces 12.

By means of an exploring optical system, which consists of a lamp 18 and a condenser system 19, there is always explored a point 20 or a small section of the curve which is transmitted by a further optical system 21 to an eccentric photoelectric device 22 which is in the zero control position and imparts no controlling impulse to the amplifier 23 when the exploratory light slot is accurately located tangentially on the curve 15, while it produces control impulses in one or other of the directions when the exploring light slot is moved too close to the curve 15 or is displaced too far from it.

The curve 15 can also be provided with additional markings such as indicated at 24, whereupon a second photoelectric system 25 responds which transmits through the contacts 26 a current impulse to the amplifier 23 which can control a further machining device, for example a tracing centering device which makes tracing marks at the required position on the workpiece 11. The additional markings 24 as well as the curve 15 may however also be used for the control of the machining device 10a or 10b, for example in such manner that thereby the automatic feed of this machining device is brought to an end and then a control of the machining device by hand can be added or interposed.

The impulses from the photoelectric device 22 are transmitted through the contact device 27 to the amplifier 23, the output lead 28 of which leads to an electromagnetic electric power amplifier 29, while the output lead 30 serves indirectly or directly for the control of the second machining device, for example a centre marker or centre punch.

The amplifier 29 obtains its drive through the connecting line 31 and transmits its control output through the connecting line 32 to a control motor 33 which drives the shaft 35 by way of a worm gear 34. By means of a crown wheel gear 36, the shaft 37 of crown wheel gear 36, the shaft 35 drives the shaft 37 of the eccentric slot arrangement 38 with the photoelectric devices 22 and 25 in such manner that, in conjunction with the hereinafter described control movement of the image holder 17, the point 20 illuminates a section of the curve 15.

For this purpose, the shaft 35 is connected through a crown wheel gear 39 with the control mechanism of a ball-type component analyser 40, the control shaft 41 of which receives a turning control movement. A further driving motor 42 receives current through a contact device 43, a line 44 and a switching and controlling device 45 in such manner that the motor rotates with an infinitely regulatable speed which corresponds to the desired feeding speed of the machining device 10.

The speed of the motor 42 is transmitted through a gearing 46 to the adjustable driving disc 47 which drives the component analyser ball or sphere 48 in such manner that, in a manner later to be explained, the component friction wheel 49 is rotated in accordance with the $x$-components and the friction wheel 50 in accordance with the $y$-components.

The friction wheel 49 is connected through a shaft 51 and pairs of bevel gears 52, 53 and 54 with the spindle 55 which imparts a movement in the direction of $x$ to the image holder 17, while the friction wheel 50 drives the spindle 59 through the shaft 56 and bevel gearing 57, 58, which spindle 59 imparts a movement in the direction of $y$ to the image carrier 17. The drives for the supporting carriage 6 (Fig. 1) and the boom arm 9 can be connected in any suitable manner with the spindle 59 or with the shaft 60 for the other spindle 55 so that the machining device executes an advancing movement corresponding to the curve 15 in accordance with the suitably arranged transmission.

Figure 2:
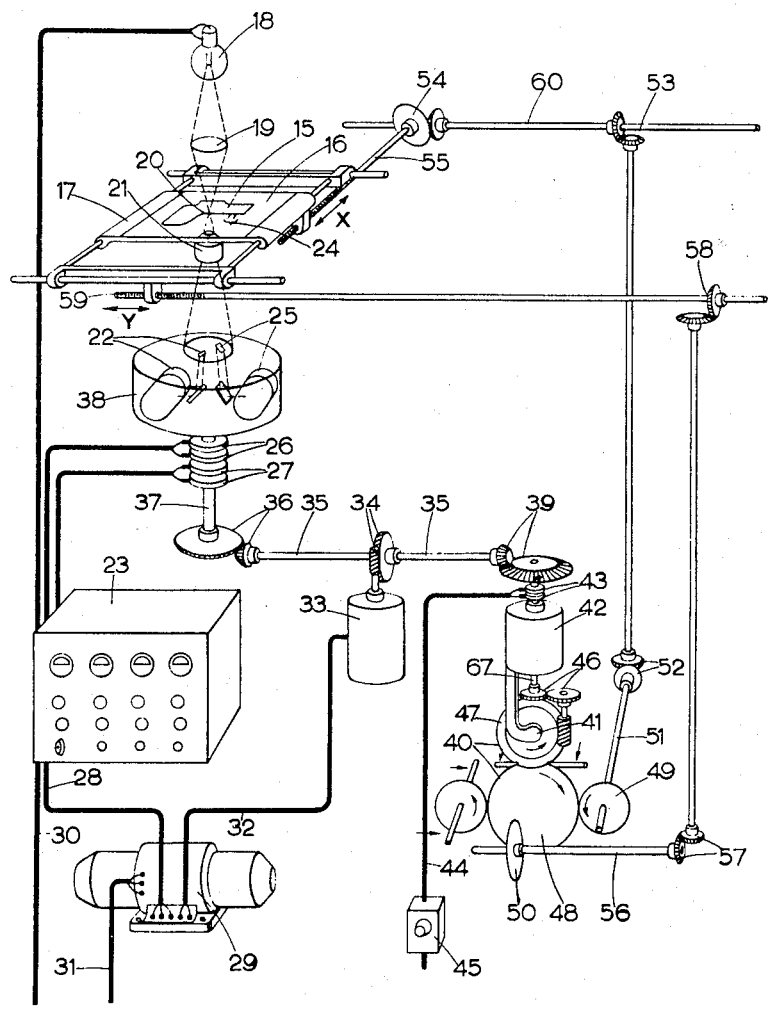
Figure 2 shows diagrammatically the assembly of the control mechanism of the exploring arrangement according to Figure 1.
Figure 3:
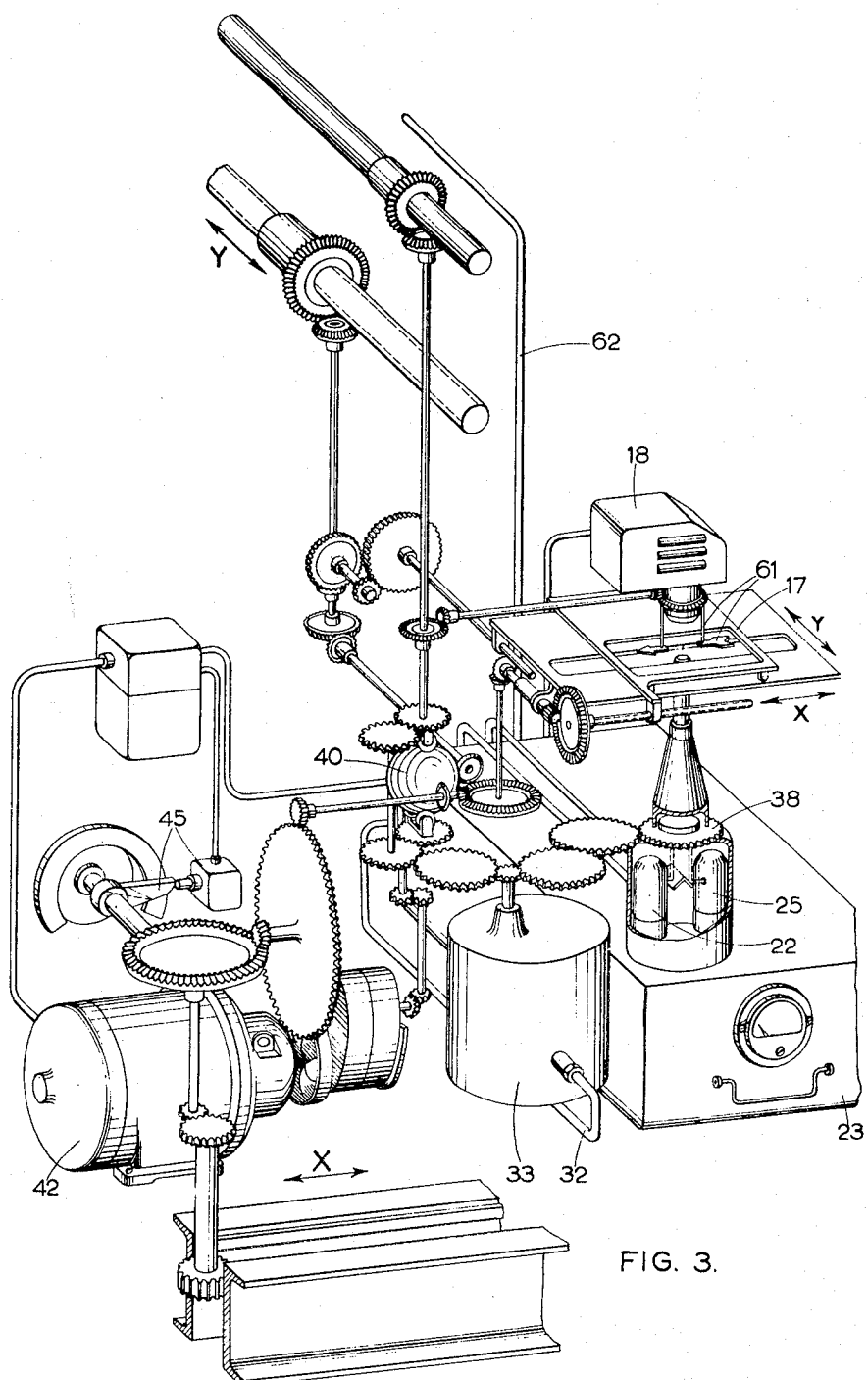
Figure 3 is a perspective view of a control installation which has been amplified with respect to the arrangement according to Figure 2.

In the constructional example according to Figure 3, the same reference numerals are used for the same elements. The direction of movement of the machining device 10 relatively to the workpiece 11 is indicated by a direction indicator 61 which is arranged in the vicinity of the curve 15 (Fig. 2) in order to permit guiding onto the curve by hand until the above-described automatic control is switched on. For the hand adjustment, the line 62 is connected with a contact device which has for example two keys, these keys operating through the amplifier 23 in such manner on the motor 33 that the latter, upon depressing one of the keys, executes a (regulatable) rotation in one direction, and upon depressing the other key, executes a rotation in the other direction, this latter movement also being regulatable. This results in an adjustment of the direction indicator 61 and thus in a feeding movement of the machining device 9, corresponding to its direction, towards the machining curve 12 of the workpiece 11, whereupon the exploring device is switched over to automatic operation by means of the switch device 8 (Fig. 1) and thereafter the control of the apparatus is carried out automatically by the photoelectric exploring device 38 in conjunction with the above-described control mechanism.

Figure 4:
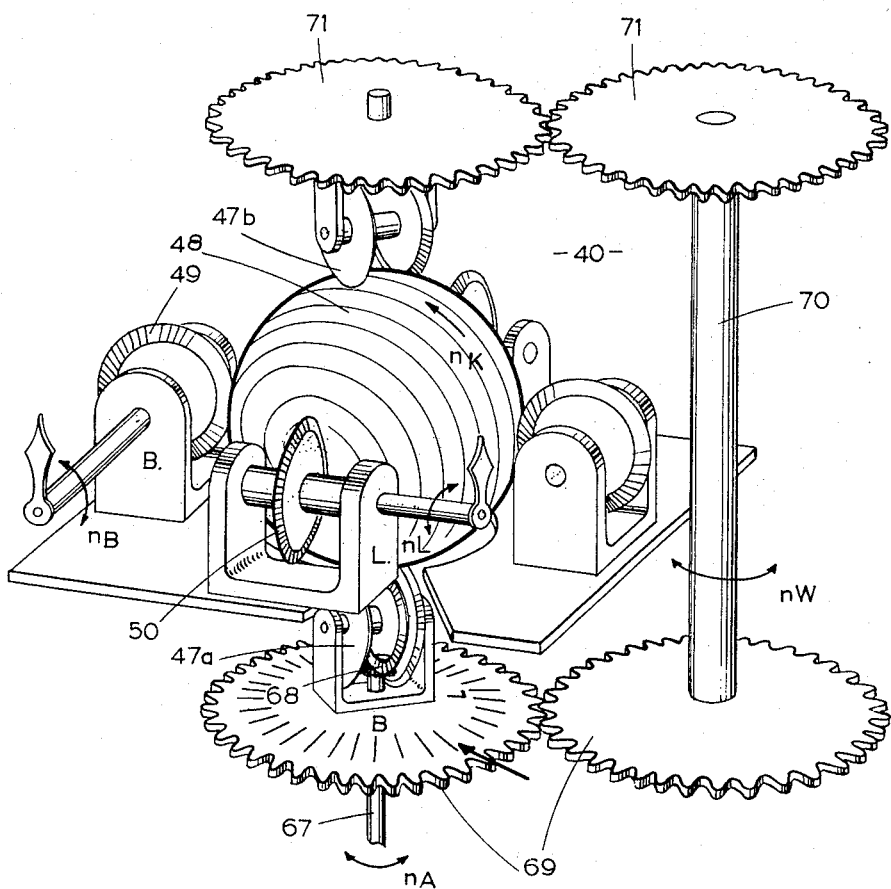
Figure 4 is a perspective view of a ball-type component analyser.

The ball-type co-ordinate analyser used in the constructional examples according to Figures 2 and 3 is shown in Figure 4, in which the same structural elements are again given the same reference numerals. The friction drive 47 is here constructed as a double pair of friction wheels 47a with a counter pair of wheels 47b and is driven from the shaft 67 through a bevel gearing 68. The shaft 67, and friction wheels 47a, are given a uni-directional speed of rotation $n_A$ from motor 42. At the same time an angular orientation of wheels 47a, corresponding to the rotation of shaft 41 in Figure 2, is transmitted to wheels 47a from motor 33 through appropriate gearing. The orienting movement of wheels 47a is transmitted to wheels 47b by means of a pair of toothed wheels 69, a shaft 70 and a pair of toothed wheels 71 in such manner that wheels 47a and wheels 47b are always oriented in the same direction. The friction wheel 50 thus has transmitted to it the $x$ components $n_L$ while the friction wheel 49 is rotated in accordance with the $y$ components $n_B$.

Figure 5 shows the drive of the ball 48 in such a position that the friction wheel 50 is rotated in accordance with the maximum value while the friction wheel 49 is stationary. This would mean that the exploring arrangement only carries out an X-control movement that therefore only the supporting carriage 6 (Fig. 1) is moved, whereas the boom arm 9 is stationary.

In the constructional example according to Figure 6, the drive of the ball is such that only the friction wheel 49 is rotated, such rotation being with the maximum value, while the friction wheel 50 is stationary. In contrast to the example according to Figure 5, the control device 68—71 has carried out a rotation of exactly 90°, which can be effected by a suitable control of the motor 33 (Figs. 2 and 3) either automatically by means of the exploring optical system or by hand. In this case, the apparatus according to Figure 1 only carries out a Y-movement and not an X-movement, that is to say the boom arm 9 is moved while the supporting carriage 6 remains stationary. In the example according to Figure 7, an intermediate position between the positions according to Figures 5 and 6 is shown. In this case, both friction wheels 49 and 50 are rotated so that the supporting carriage 6 and the boom arm 9 in Figure 1 are moved simultaneously and the machining device 10a or 10b is given a feeding movement, the direction of which corresponds to that of the arrow 61 indicating the direction of travel.

We claim:

1. In a photo-electric curve exploring apparatus for producing curves on a piece of work, comprising a curve producing work-shaping device and means for supporting a plate bearing a curve to be reproduced, the provision of at least one photo-electric cell, a rotary container in which said cell is mounted, said container being mounted for rotation about an axis, an opening in one wall of said container, said opening being eccentric in relation to said axis, light beam means for projecting a beam through the said plate and through said opening onto said cell, means for transmitting electric control currents from said cell varying in accordance with the position of the cell relative to said curve, amplifying means for amplifying said currents, an analysing device, means for driving said analysing device according to the desired speed of advance of said element, means for orienting said analysing device and said rotary container according to said amplified currents, first output means deriving motion from said analysing device according to a first component of direction of said curve, second output means deriving motion from said analysing device according to a second component of direction of said curve, and means for transmitting motion from said first and second output means both to said work-shaping device and to said plate supporting means, the direction of eccentricity being maintained in the same direction as the ultimate curve following movement relatively between the said container and the curve.

2. Apparatus as claimed in claim 1, wherein the analysing device comprises a ball and friction wheels driving the ball, said wheels being adjusted into different directions according to said amplified currents.

3. Apparatus as claimed in claim 1, having an arm carrying the work-shaping device, a supporting carriage carrying the arm, said arm and carriage being moved in different directions in relation to each other, one by said first output means, and the other by said second output means.

References Cited in the file of this patent

UNITED STATES PATENTS

| | | |
|---|---|---|
| 1,706,238 | Lempereur et al. | Mar. 19, 1929 |
| 2,261,644 | Cockrell | Nov. 4, 1941 |
| 2,427,158 | Poitras et al. | Sept. 9, 1947 |
| 2,430,924 | Fowle et al. | Nov. 18, 1947 |
| 2,461,585 | Anderson | Feb. 15, 1949 |
| 2,499,178 | Berry et al. | Feb. 28, 1950 |
| 2,559,097 | Trinkle | July 3, 1951 |
| 2,570,405 | Tandler et al. | Oct. 9, 1951 |
| 2,611,887 | Lobosco | Sept. 23, 1952 |